US009166993B1

United States Patent
Liu

(10) Patent No.: US 9,166,993 B1
(45) Date of Patent: Oct. 20, 2015

(54) ANOMALY DETECTION BASED ON PROFILE HISTORY AND PEER HISTORY

(71) Applicant: SYMANTEC CORPORATION, Mountain View, CA (US)

(72) Inventor: Yin Liu, Sunnyvale, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 258 days.

(21) Appl. No.: 13/950,744

(22) Filed: Jul. 25, 2013

(51) Int. Cl.
*H04L 29/06* (2006.01)

(52) U.S. Cl.
CPC .................................. *H04L 63/1425* (2013.01)

(58) Field of Classification Search
CPC .................................................... H04L 63/1416
See application file for complete search history.

(56) References Cited

U.S. PATENT DOCUMENTS 6,405,318 B1 * 6/2002 Rowland .......................... 726/22
8,443,443 B2 * 5/2013 Nordstrom et al. .............. 726/23
8,566,956 B2 * 10/2013 Slater .............................. 726/28

OTHER PUBLICATIONS

Vijaya Bhaskar Velpula, Behavior anomaly based system for detecting insider attacks and data mining, May 2009, vol. 1.*
Salvatore J. Stolfo et al., "Anomaly Detection in Computer Security and an Application to File System Accesses," M.-S. Hacid et al. (Eds.): ISMIS 2005, LNAI 3488, 2005, pp. 14-28, Springer-Verlag Berlin, Heidelberg, Germany.
You Chen, "Detection of Anomalous Insiders in Collaborative Environments via Relational Analysis of Access Logs," CODASPY '11, Feb. 21-23, 2011, 12 pages, ACM 978-1-4503-0465, San Antonio, Texas, USA.

* cited by examiner

*Primary Examiner* — Kambiz Zand
*Assistant Examiner* — Thanh Le
(74) *Attorney, Agent, or Firm* — Lowenstein Sandler LLP

(57) ABSTRACT

A method and apparatus for automatic anomaly detection based on profile history and peer history are described. An anomaly detection system collects file-activity data pertaining to file accesses activities in a network share. The system computes file access patterns for the individual users and compares the individual user's file access pattern against a profile history to find a first deviation. The system also identifies a cluster of users from the group based on at least one of user collaborations of individual users of the group or a reporting structure of the group of users. When the first deviation is found, the system compares the user's file access pattern against a peer history of the other individual users in the cluster to find a second deviation. The system reports an anomaly in the file access patterns by the individual user when the first deviation and the second deviation are found.

20 Claims, 5 Drawing Sheets

ANOMALY DETECTION BASED ON PROFILE HISTORY AND PEER HISTORY

TECHNICAL FIELD

Embodiments of the invention relate to the field of processing data, and more particularly, to automatic anomaly detection based on profile history and peer history.

BACKGROUND

Traditional antivirus software that uses signatures to detect malware offers limited protection for uncharacterized threats (known as 0-day exploits). Malware is software that is designed to infiltrate or damage a computer system without the informed consent of a user or administrator. Malware includes computer viruses, worms, Trojan horses, rootkits, spyware, adware, crimeware (a class of malware designed to automate financial or political crime), and other dishonest or unwanted software. Such antivirus software typically does not detect or remove malware until a signature for the malware has been written and distributed to the antivirus software. This delay poses a serious threat for computer systems.

Heuristic engines have been developed by antivirus vendors to detect malware without using signatures. However, these heuristic engines usually examine how potential malware interacts with the operating system on which they operate (e.g., hooking application programming interfaces (APIs), injecting code, modifying registry keys, etc. These heuristic engines often analyze the code of the potential malware to determine if the actions that it takes are typical of malware. Conventional antivirus heuristic engines typically do not have any information regarding whether data contains confidential information, nor do conventional heuristic engines typically analyze how potential malware behaves with regards to confidential information.

SUMMARY OF THE INVENTION

A method and apparatus for automatic anomaly detection based on profile history and peer history are described. An anomaly detection system, executing by a processor, is to collect file-activity data pertaining to file accesses to files in an identified network share accessed by a group of users. The anomaly detection system computes file access patterns for individual users in the group from the file-activity data and, for one of the individual users, compares the individual user's file access pattern against a profile history of the individual user to find a first deviation in the file accesses by the individual user. The anomaly detection system also identifies a cluster of users from the group based on at least one of user collaborations of individual users of the group or a reporting structure of the group of users. When the first deviation is found, the anomaly detection system compares the individual user's file access pattern against a peer history of the other individual users in the cluster to find a second deviation. The anomaly detection system reports an anomaly in the file access patterns by the individual user when the first deviation and the second deviation are found.

In some embodiments, the anomaly detection system computes the file access patterns for the individual users in the group within a certain time frame. In other embodiments, the anomaly detection system identifies the cluster by importing an active directory (AD). The AD comprises entries of the group of users and the reporting structure of the group of users.

In some embodiments, the anomaly detection system identifies the cluster by determining the user collaborations of individual users of the group from the file-activity data. In a further embodiment, the anomaly detection system determines the user collaborations by inspecting the file-activity data to determine at least one of a set of common files accessed by the cluster of users or a set of files in the identified network share with contributions by the cluster of users.

In some embodiments, the network share is mounted and shared among the group of users in a collaborative environment. The file-activity data is stored in one or more file access logs. In a further embodiment, the one or more file access logs are divided according to periodic time frames.

In some other embodiments, the anomaly detection system computes the file access patterns for one of the individual users comprises determining at least one of directories access by the individual user, files accessed by the individual, typical access times of the files by the individual user, frequency of access by the individual user, or a network location of the individual user when accessing the files (e.g., IP address).

In some embodiments, the anomaly detection system reports the anomaly by identifying an incident record corresponding to one of the file accesses of one of the files that contains sensitive information by the individual user and classifying the incident record with a higher priority than other incident records.

In addition, a computer readable storage medium includes for automatic anomaly detection based on profile history and peer history is described. An exemplary computer readable storage medium provides instructions, which when executed on a processor causes the processor to perform operations such as the exemplary methods discussed above.

Further, systems and apparatus for automatic anomaly detection based on profile history and peer history are described. An exemplary apparatus may include a memory and a processor coupled to the memory. The processor is configured to perform various operations, such as those described above.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
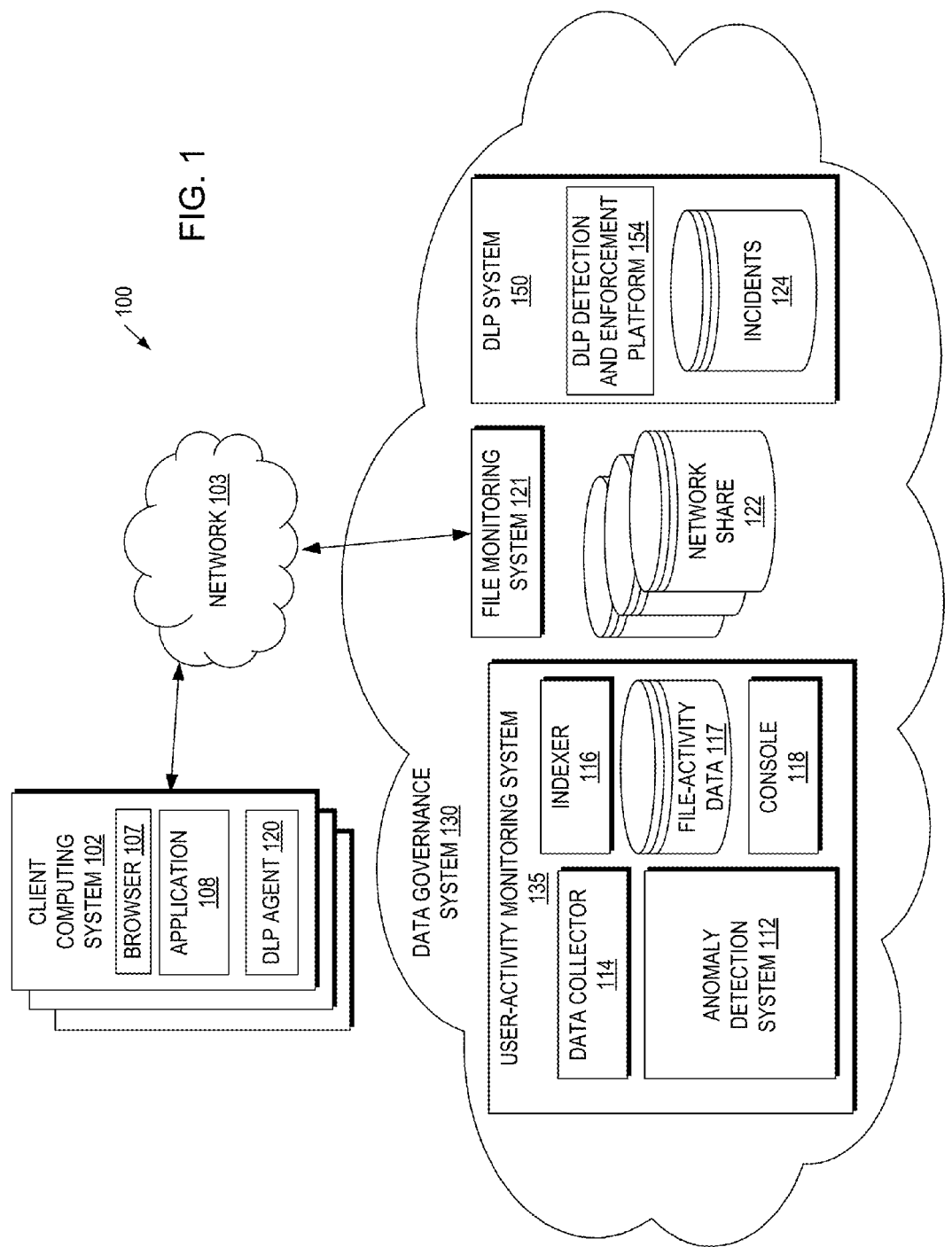
FIG. 1 is a block diagram of an exemplary network architecture in which embodiments of an anomaly detection system may operate.

A method and apparatus for automatic anomaly detection based on profile history and peer history are described.

According to some aspects of the present disclosure, an anomaly detection system collects file-activity data pertaining to file accesses to files in an identified network share accessed by a group of users. The anomaly detection system computes file access patterns for individual users in the group from the file-activity data and, for one of the individual users, compares the individual user's file access pattern against a profile history of the individual user to find a first deviation in the file accesses by the individual user. The anomaly detection system also identifies a cluster of users from the group based on user collaborations of individual users of the group and/or a reporting structure of the group of users. When the first deviation is found, the anomaly detection system compares the individual user's file access pattern against a peer history of the other individual users in the cluster to find a second deviation. The anomaly detection system reports an anomaly in the file access patterns by the individual user when the first deviation and the second deviation are found.

It takes time and expertise for system administrators to notice an anomalous state in a large pool of system logs and reported incidents. Conventional systems do not provide data intelligence while monitoring file access activities and do not include automation mechanisms for anomaly detection. Conventional anomaly detection approaches are either using a single ground truth/model while ignoring the environment's collaborative property, or using deviation calculation while ignoring the environment's dynamic and time-sensitive property. In one conventional approach, data mining or machine-learning approaches are used to develop a training set. This approach is a supervised approach is specification based and requires the training set to be provided to the system with clearly labeled data. The resulting models are then applied to classify new actions into one (or more) of the labels. Another approach is an unsupervised approach that is designed to make use of the inherent structure or patterns in a dataset to determine when a particular instance is sufficiently different.

The embodiments described herein consider the two facts that file sharing and file sensitivity would vary with department and time. The embodiments describe herein collect file accesses on a particular share (e.g. file system). The file access logs may be divided with monthly time frames. An algorithm can compute each individual users file access pattern (e.g., directories and files accessed, typical access time, frequency, access IP address, or the like). The user file access pattern is then compared with one's own history profile to find the deviation. Meanwhile, the algorithm can also utilize the social network clustering to cluster users into a cluster based on their collaboration, based on their reporting structure, or a combination of both. Then the deviation user which exhibit anomalous behavior from other users in the social network group can be identified by the algorithm. Combining the two deviation sets from history and peer would help identify or classify the most high-priority incidents that require the attention from system administrators.

There are user-activity monitoring systems that enable organizations to improve data governance through insights into the ownership and usage of unstructured data, including files such as documents, spreadsheets and emails. The embodiments of the anomaly detection system described herein can be implemented in connection with these user-activity monitoring systems. For example, the user-activity monitoring system can import an Active Directory (AD) as well as record all file accesses to a share. These events can be queried later to find, for example, who inserted sensitive information into a file. Since these shares are mounted and shared among several (possibly thousand) users across an organization, it is a collaborative and dynamic environment.

Users generally exhibit similar behavior when their roles remain unchanged. Due to the highly collaborative behaviors on the shared servers, users also exhibit similar behavior with their collaborators within certain time frame. By observing these properties, the anomaly detection mechanism would consider the deviation based on both history profiles and peer groups. The file access pattern for an individual user considers the following factors for a given time frame (typically obtained from the access log per month): which files the user accessed during that time frame, what time range does the user typically access files, which directories the user typically access, what frequency the user access the files, from which IP and which location the user typically access the files, which users/users group that the user collaborate with (e.g., by accessing frequently on the same file/directory sets) etc. Each factor in the file access pattern can be assigned with different weights when considering deviation. After obtaining each individual user's file access pattern for the time frame given, next step would be comparing the pattern with history and peers. The history patterns can be drawn similarly by obtaining the history access logs which also records user's reporting structure in the past. Each month's history pattern is computed and then put into the comparison set. The monthly history pattern can be filtered if user has a complete different role in the AD for that month, which indicates that the user changed the role in the company by reporting to a different team or changed career path. Deviation of the current access pattern from the history patterns is computed by assigning different weights to the history patterns with more emphasis on the nearer time frames. The algorithm uses weighted standard deviation to find whether current pattern's deviation is higher than the mean of the deviations.

In order to compare the file access patterns with peers, the algorithm needs to identify a peer set. The algorithm may use social network clustering algorithms to cluster users into groups based on their collaboration, i.e. they work mostly on the same projects. The social network groups would then be evaluated with the AD groups, i.e. users report to the same manager. If the social network group size is too small (e.g., user has very few file access) or too large (e.g., user touches lots of files but not focused on a subset of them), the algorithm can use AD groups instead. This results in the final peer group selection. For each user in the peer group, the file access patterns are computed. For each user, the deviation computation could assign more weights on the users in that peer group with the same AD group. Then the algorithm can apply the standard weighted deviation algorithm to obtain whether the user deviates from others in the same peer group, particularly whether the user is deviated from others in the same peer and AD group.

Finally, the algorithm can report all the deviation results in terms of which pattern factors caused the deviation to the system administrators. The deviation results can be ranked higher if they exist in both of the deviation results for history and peer deviation results.

The embodiments described herein can provide various advantages over other solutions. The embodiments described herein can provide an improved anomaly detection system than conventional systems that do not utilize these embodiments. One advantage may be that anomalies can be detected in a large pool of logs automatically with low false positives. The embodiments also address the challenge that corporate data generally exhibits collaborative property and the data policy varies with group and changes over time by considering the factors of history and peer clustering. The embodiments described herein can provide higher quality output of analysis than conventional systems.

FIG. 1 is a block diagram of an exemplary network architecture in which embodiments of an anomaly detection system may operate. The network architecture 100 may include a data governance system 130, a client computing system (hereinafter client, client device or user device; multiple client devices 110, each capable of communicating with one another via a network 103. Network 103 may include, for example, a private network such as a local area network (LAN), a wide area network (WAN), a global area network (GAN) such as the Internet, or a combination of such networks, and may include a wired or wireless network. The data governance system can be part of a cloud computing system. Cloud computing (the 'cloud') may refer to the access of computing resources over a computer network. Cloud computing (also referred to as a private cloud or a public cloud) allows for a functional separation between the computing resources used and the physical machine where the user is working. Users may access the resources in the data governance system 130 using client computing systems 102 (e.g., user devices), server computing systems, gateways, workstations, or the like. User devices can include managed user devices and unmanaged user devices. A managed user device refers to a user device (owned by a corporation or the user) over which the corporation can exercise some level of control. In particular, the corporation has control over what applications or programs can be installed and run on a managed user device. An unmanaged user device is a user device owned by the user that is not controlled by the corporation, such as an employee's home computer or personal cell phone. The client computing system 102 may be a personal computer, a tablet computer, a mobile phone such as a smart phone, a personal digital assistant (PDA), a portable media player, a netbook or the like.

The user can download various applications to the client device 102. In the depicted embodiment, the client computing system 102 includes browser 107 and application 108. The browser 107 (or application 108) can be used to access one or more network shares 122, as well as other resources of the data governance system 130, such as a DLP system 150 described below. Application 108 can be any type of application, executable, program, etc. For example, the client computing system 102 may be a smartphone and the application is a mobile app that can access the client device 110 over the network 103. The smartphone may also include the browser 107 that can be used to access the client device 110. Alternatively, the client computing system 102 may be a personal computer and the browser 107 may be used to access the client device 110.

Cloud computing, as used herein, refers to a collection of computing resources (hardware and software) that deliver services over a network, typically the Internet. There are many types of public cloud computing, and enterprises may use private cloud computing. In some cases, an end-user on the client computing system 102 access cloud-based services or cloud-based resources over the network 103. For example, end-users can access cloud-based applications through a web browser or a light-weight client application or mobile app and the software and user's data are stored on a computing system of the data governance system 130, such as servers at a remote location from the client computing system 102. Although the embodiments described herein are in the context of cloud computing, the embodiments may also be used in other configurations, such as client-server models, grid computing models, peer-to-peer, distributed computing models, or the like.

In the depicted embodiment, the data governance system 130 provides an anomaly detection system 112. In one embodiment, the anomaly detection system 112 is part of, or used in connection with a user-activity monitoring system 135. In one embodiment, the user-activity monitoring system 135 is the Symantec Data Insight Technology, developed by Symantec Corporation. The Symantec Data Insight Technology can leverage security and storage technologies and can infer data ownership based on usage, track utilization (data, user), and calculate access patterns, store logs of file access activities. The Symantec Data Insight Technology can be used in connection with a file system monitoring system 121 that monitors file access activities of the identified data, such as data in the one or more network shares 122. A data collector 114 can be used to collect file-activity data 117 from the file monitoring system 121. The file-activity data 117 may be regular file-system I/Os, such as read, write, rename, or the like. The file-activity data 117 may be via an application (e.g., a database server that is writing to a file on a network share) or a human who maps the file-share and accesses files on the file-share. The data collector 114 can store file-activity data 117 in a file-activity data store, which may be a file system, a database or other data management layers resident on a data storage device such as a disk drive, RAM, ROM, database, etc. The user-activity monitoring system 135 can use an indexer 116 to create an index of the file-activity data 117. The user-activity monitoring system 135 can provide data insights into the ownership of data and usage intelligence. The user-activity monitoring system 135 can be used in connection with storage management tools, data loss prevention (DLP) tools, information management tools. For example, the DLP system 150 can scan for sensitive data and generate a large list of incidents and the user-activity monitoring system 135 can identify data or business owners of the data and track usage and permissions of the data. The DLP system 150 can use this information to remediate or prevent incidents to simplify remediation and maximize risk reduction. The user-activity monitoring system 135 can automate data owner identification and identify the top number of users, readers, writers of a document, and can aggregate incidents. The user-activity monitoring system 135 can determine the full file access history of a document, a history profile of a user, and a peer history profile as described herein. This can be used to help understand the scope of data usage. The user-activity monitoring system 135 can also provide data access visualization and history via a console 118. The console 118 can be a web-based console that provides a user interface in a browser or as part of an application. For example, an administrator can access the console 118 to view visualizations of the file-activity data 117, as well as to set the settings and configurations of the anomaly detection system 112. The console 118 can be used to open share identification information, to view who has seen the data (data spill) and to perform user investigations. Additional details of the user-activity monitoring system 135 are described below with respect to FIG. 2.

Organizations take lot of efforts to install DLP components, especially on important machines where confidential data is getting generated, but they may not be able to protect each computer in the enterprise, due to reasons like large number of different platforms or operating systems (OS), machine outages, quick and dynamic provisioning of virtual machines, no clear and individual accounting for test and lab machines. DLP technologies apply configurable rules to identify objects, such as files, that contain sensitive data and should not be found outside of a particular enterprise or specific set of host computers or storage devices. Even when these technologies are deployed, it is possible for sensitive objects to 'leak'. Occasionally, leakage is deliberate and malicious, but often it is accidental too. For example, in today's global marketplace environment, a user of a computing system transmits data, knowingly or unknowingly, to a growing number of entities outside a computer network of an organization or enterprise. The DLP system 150 may communicate with DLP agents 120. Although the embodiments may be used in connection with a DLP system using DLP agents 120, the embodiments may also be used in other data governance products, such as standalone user-activity monitoring system or a DLP system deployed on a gateway or on a server computing system without the use of DLP agents 120. Alternatively, the embodiments may be used in connection with a DLP system that scans data at rest and does not monitor data in motion as described herein. Also, the embodiments described herein may be used in other applications that can be used for detecting violations of policies as would be appreciated by one of ordinary skill in the art having the benefit of this disclosure. The DLP agents 120 may include a DLP content scanning engine that scans the data content based on the DLP policies defined by the DLP system 150. The outbound data transfers can be to various types of destinations, including other computing systems in the network architecture 100 or other destinations, such as remote devices, USB drives, network drives, printers or the like. The DLP agent 120 monitors outbound data transfers by the client computing system 102 (e.g., transmitting entity) to destination entities to detect violations of the DLP policy using the DLP policies. When a violation is detected in one of the data transfers, the DLP content scanning engine can initiate a DLP action to protect the data being protected by the DLP policies. In one embodiment, the destination entity is the second computing system 102, which includes a DLP agent 120, developed by the same vendor as the DLP agent 120 of the client computing system 102. In another embodiment, the destination entity is a third computing system 102, which includes a DLP agent 120, developed by a different vendor as the DLP agent 120.

The DLP system 150 may communicate with DLP agents 120 on the client computing systems 102 to perform operations to enforce a DLP policy as described herein. These DLP actions can be preventive actions, such as preventing the data transfer. Alternatively, the DLP actions can be remedial, such as creating a record that can be addressed by an administrator or that triggers some other manual or automated processes. In one embodiment, when the data transfer violates the DLP policy, the DLP agent 120 creates an incident record of the violation, and may send the incident record to the DLP system 150, for example. The DLP system 150 is configured to receive the incident record of the violation from the DLP agent 120. In these embodiments, the DLP agent 120 creates the incident records. However, in other embodiments, any DLP product may be used to detect a violation and create an incident, and it is not limited to using DLP agents on an endpoint, as described herein. The DLP system 150 can also include a DLP detection and enforcement platform 154 that can scan the data on the network shares 122 and create one or more incidents 124. The DLP detection and enforcement platform 154 can include two components: data at rest and data in motion. The DLP detection and enforcement platform 154 can scan for sensitive information in the share for data at rest and can stop files (identified as containing sensitive information) from leaking out. The incidents 124 can be stored in a data store and can be accessed by the user-activity monitoring system 135 for further analysis to automatically detect anomalies in the file accesses by individual users as described herein. Although the user-activity monitoring system 135, file monitoring system 121 and DLP system 150 are illustrated as separate components, in other embodiments the functionality of any of these components can be integrated into one or more components.

Figure 2:
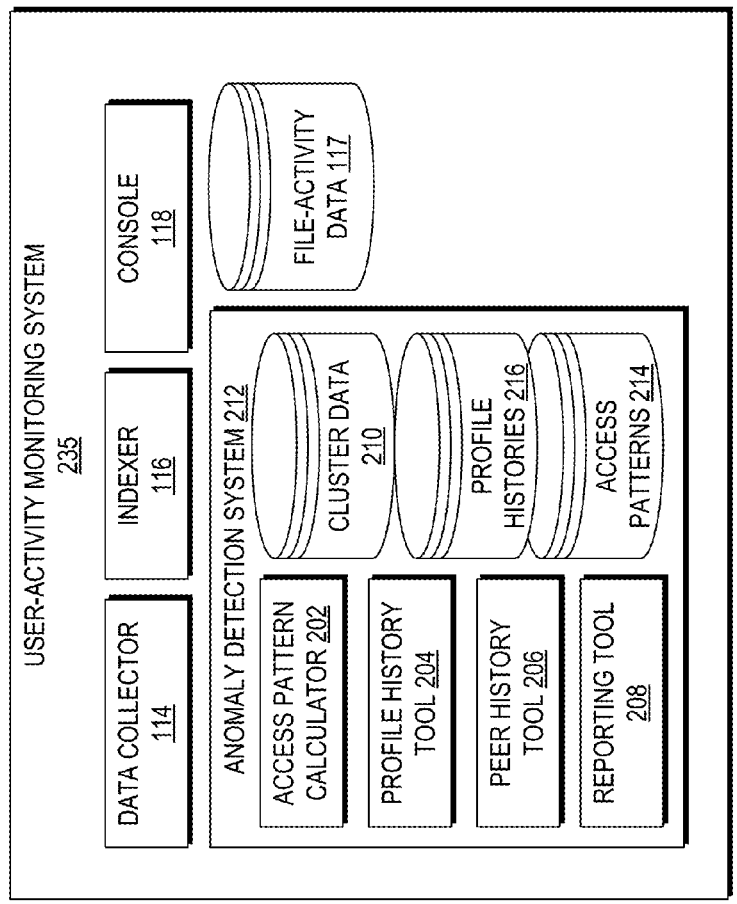
FIG. 2 is a block diagram of an anomaly detection system for automatic anomaly detection based on profile history and peer history according to one embodiment.

FIG. 2 is a block diagram of an anomaly detection system 212 for automatic anomaly detection based on profile history and peer history according to one embodiment. The anomaly detection system 212 can be used for automatic anomaly detection based on profile history and peer history. The user-activity monitoring system 235 can be executed by a processor. The user-activity monitoring system 235 can use the data collector 114 to collect file-activity data 117 pertaining to file accesses to files in an identified network share 122 accessed by a group of users. The user-activity monitoring system 235, using an access pattern calculator 202, computes file access patterns 214 for individual users in the group from the file-activity data 117. For one of the individual users, the anomaly detection system 212 compares the individual user's file access pattern 214 against a profile history 216 of the individual user to find a first deviation in the file accesses by the individual user. The user-activity monitoring system 235 also identifies a cluster of users from the group based on at least one of user collaborations of individual users of the group or a reporting structure of the group of users. The identified clusters can be stored a cluster data 210. When the first deviation is found, the user-activity monitoring system 235 compares the individual user's file access pattern 214 against a peer history of the other individual users in the cluster to find a second deviation. The profile history of each of the individual users can be calculated by a profile history tool 204 and stored in the file-activity data 117. The peer history can be the file access patterns 214 of the other users in the cluster identified in the cluster data 210. The peer history of the cluster can be calculated by a peer history tool 206. The user-activity monitoring system 235, using a reporting tool 208, reports an anomaly in the file access patterns 214 by the individual user when the first deviation and the second deviation are found. Although DLP agents 120 are described, the embodiments of the anomaly detection system can be used with other data governance products, such as cloud-based service including a DLP system, and can be used without a DLP system.

The anomaly detection system 212 can analyze the file-activity data 117 file sharing, file sensitivity and file accesses according to a department (e.g., a cluster) and time. The anomaly detection system 212 can collect file accesses on a particular share (e.g. file system). The file access logs, from a file monitoring system, may be divided with monthly time frames. The anomaly detection system 212 can compute each individual users file access pattern (e.g., directories and files accessed, typical access time, frequency, access IP address, or the like). The anomaly detection system 212 can compare the user file access pattern with one's own history profile to find the deviation. Meanwhile, the anomaly detection system 212 can also utilize the social network clustering to cluster users into a cluster based on their collaboration, based on their reporting structure, or a combination of both. Then a deviation user, which exhibit anomalous behavior from other users in the social network group, can be identified by the anomaly detection system 212. The anomaly detection system 212 can combine the two deviation sets from profile history and peer history to identify or classify the most high-priority incidents that require the attention from system administrators.

In another embodiment, the user-activity monitoring system 235 can import an Active Directory (AD) as well as record all file accesses to a share. These events can be queried later to find, for example, who inserted sensitive information into a file. Since these shares are mounted and shared among several (possibly thousand) users across an organization, it is a collaborative and dynamic environment. Users generally exhibit similar behavior when their roles remain unchanged. Due to the highly collaborative behaviors on the shared servers, users also exhibit similar behavior with their collaborators within certain time frame. The anomaly detection system 212 can observe these properties and can identify the deviation based on both history profiles and peer groups. The file access pattern for an individual user considers the following factors for a given time frame (typically obtained from the access log per month): which files the user accessed during that time frame, what time range does the user typically access files, which directories the user typically access, what frequency the user access the files, from which IP and which location the user typically access the files, which users/users group that the user collaborate with (e.g., by accessing frequently on the same file/directory sets), etc.

The anomaly detection system 212 can assign a factor in the file access pattern with different weights when considering deviations. After obtaining each individual user's file access pattern for the time frame given, the anomaly detection system 212 can compare the file access pattern with the profile history and peers history. The anomaly detection system 212, using the profile history tool 204, can calculate the history patterns 216 by obtaining the history access logs (e.g., file-activity data) which also records the users' reporting structure in the past. Each month's history pattern can be computed by the anomaly detection system 212 and then put into the comparison set. The anomaly detection system 212 (or the profile history tool 204) can filter the monthly history pattern 216 if a user has a complete different role in the AD for that month, which indicates that the user changed the role in the company by reporting to a different team or changed career path. The anomaly detection system 212 can calculate the deviation of the current access pattern from the history patterns by assigning different weights to the history patterns 216 with more emphasis on the nearer time frames. The anomaly detection system 212 can use a weighted standard deviation to find whether a current pattern's deviation is higher than the mean of the deviations, for example.

In order to compare the file access patterns with peers, the anomaly detection system 212 identifies a peer set (also referred to herein as a cluster). The anomaly detection system 212 may use social network clustering algorithms to cluster users into groups based on their collaboration, i.e. they work mostly on the same projects. The anomaly detection system 212 can evaluate the social network groups with the AD groups, i.e. users report to the same manager. If the social network group size is too small (e.g., user has very few file access) or too large (e.g., user touches lots of files but not focused on a subset of them), the anomaly detection system 212 can use AD groups instead. The anomaly detection system 212 can output a final peer cluster selection. For each user in the peer cluster, the anomaly detection system 212 computes the file access patterns 214. For each user, the deviation computation by the anomaly detection system 212 could assign more weights on the users in that peer cluster with the same AD group. Then the anomaly detection system 212 can apply a standard weighted deviation algorithm to obtain whether the user deviates from others in the same peer cluster, particularly whether the user is deviated from others in the same peer cluster and AD group.

The anomaly detection system 212, using the reporting tool 208, can report all the deviation results in terms of which user, which pattern factors caused the deviation to the system administrators. The anomaly detection system 212 can rank the deviation results higher if they exist in both of the deviation results for history and peer deviation results.

Figure 3:
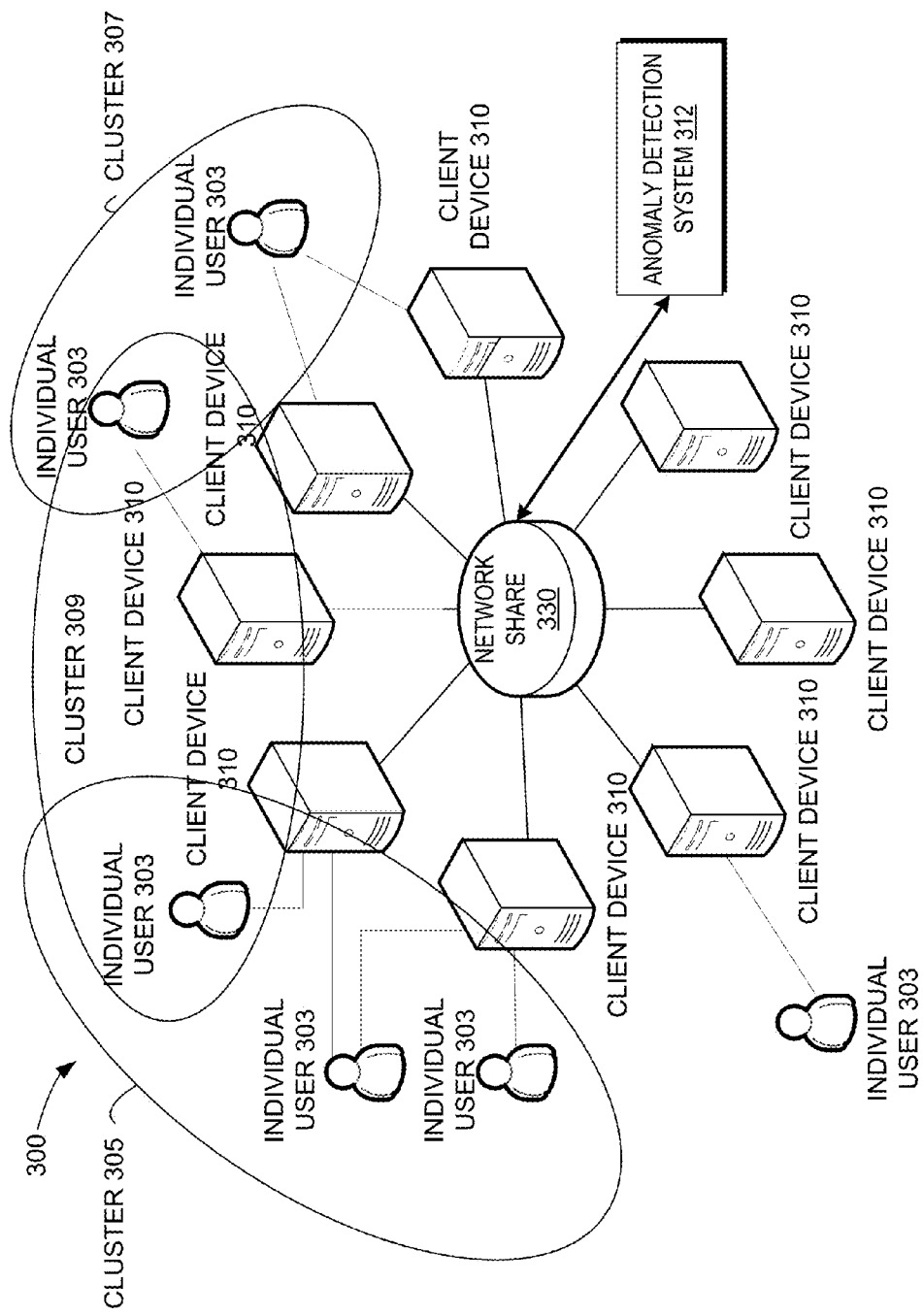
FIG. 3 is a network diagram of an anomaly detection system for automatic anomaly detection based on profile history and peer history for multiple client devices in a network according to one embodiment.

FIG. 3 is a network diagram of an anomaly detection system 313 for automatic anomaly detection based on profile history and peer history for multiple client devices 310 in a network 300 according to one embodiment. The network 300 includes multiple client devices 310. Individual users 303 use the client devices to access a network share 330. The network share 330 can be mounted and shared among several individual users 303. The anomaly detection system 313 can track file access activities of data in the network share 330 by the individual users 303. The anomaly detection system 313 can compute file access patterns for the individual users. The anomaly detection system 313 can also identify one or more clusters of individual users, such as clusters 305, 307 and 309. The clusters 305, 307 and 309 can be identified automatically based on the file-activity data as described herein. The clusters 305, 307 and 309 are merely examples, and more or less clusters can be identified and more or less individual users can be part of the identified clusters. Also, as illustrated, the individual users may belong to more than one cluster. The anomaly detection system 313 can perform various steps to automatically detect anomalies in the file access activity of the individual users 203. The anomaly detection system 313 can profile a current file access activity through history comparison and peer comparison to automatically detect anomaly in a data governance system. The anomaly detection system 313 can monitor file access activities, such as file-activity data from a file server, and can index the file usage data in records as file-activity data. The anomaly detection system 313 can compute file access patterns as described herein and compare the file access patterns against profile histories and peer histories as described herein. For example, one individual user's 303 file access pattern can be compared against a profile history of the individual user 303 and against file access patterns of the other individual users 303 in the cluster (e.g., 305, 307 or 309). When deviations are found in the profile history and the peer history, the anomaly detection system 313 can report the anomaly.

Figure 4:
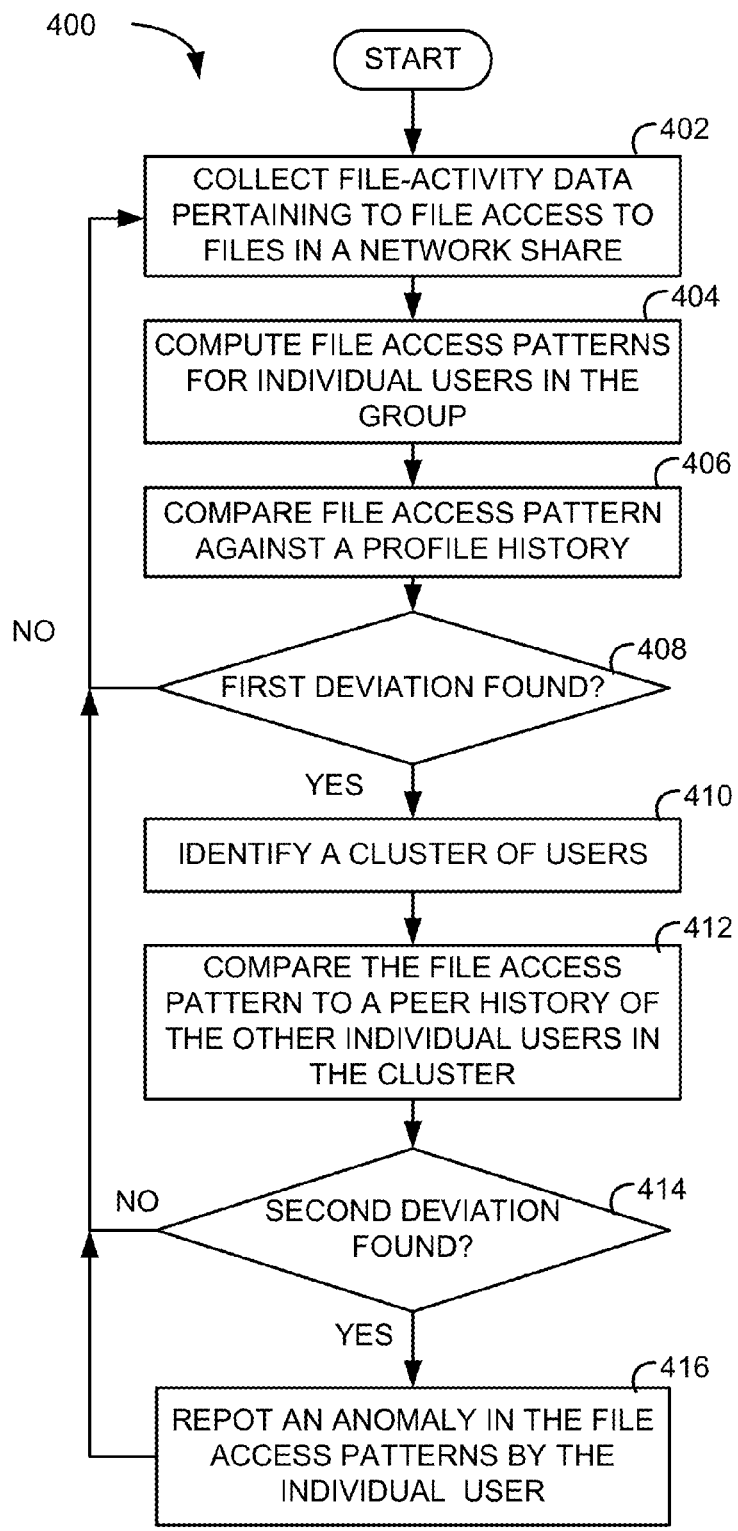
FIG. 4 is a flow diagram of one embodiment of a method of automatically detecting anomalies based on profile history and peer history.

FIG. 4 is a flow diagram of one embodiment of a method 400 of automatically detecting anomalies based on profile history and peer history. The method 400 is performed by processing logic that may comprise hardware (circuitry, dedicated logic, etc.), software (such as is run on a general-purpose computing system or a dedicated machine), or a combination of both. In one embodiment, the anomaly detection system 112 or 212 performs the method 400. In another embodiment, the user-activity monitoring system 135 of FIG. 1 performs the method 400. In another embodiment, the anomaly detection system 212 of FIG. 2 performs the method 400. In another embodiment, the anomaly detection system 312 of FIG. 3 performs the method 400. Alternatively, other components of the client computing system 102, client device 110, or data governance system 130 can be configured to perform some or all of the method 400.

Referring to FIG. 4, method 400 begins by the processing logic collecting file-activity data pertaining to file accesses to files in an identified network share accessed by a group of users (block 402). The processing logic computes file access patterns for individual users in the group from the file-activity data (block 404). For one of the individual users, the processing logic compares the individual user's file access pattern against a profile history of the individual user to find a first deviation in the file accesses by the individual user (block 406). The processing logic determines whether the first deviation is found (block 408). If not, then the processing logic returns to block 402. If the processing logic determines that the first deviation is found, the processing logic identifies a cluster of users from the group based on at least one of user collaborations of individual users of the group or a reporting structure of the group of users (block 410). The processing logic can use social network clustering as described herein. Alternatively, the processing logic can use an active directory or the like to identify the cluster. The processing logic compares the individual user's file access pattern against a peer history of the other individual users in the cluster to find a second deviation (block 412). The processing logic determines whether the second deviation is found (block 414). If not, the processing logic returns to block 402. If the processing logic determines that the second deviation is found, the processing logic reports an anomaly in the file access patterns by the individual user when the first deviation and the second deviation are found (block 416) and returns to block 402.

In a further embodiment, the processing logic computing the file access patterns for the individual users in the group within a certain time frame at block 404. In another embodiment, the processing logic, at block 410, identifies the cluster by importing an active directory (AD), the AD including entries of the group of users and the reporting structure of the group of users. Alternatively, the processing logic identifies the cluster by determining the user collaborations of individual users of the group from the file-activity data at block 410. For example, the processing logic can inspect the file-activity data to determine at least one of a set of common files accessed by the cluster of users or a set of files in the identified network share with contributions by the cluster of users.

In one embodiment, the network share is mounted and shared among the group of users in a collaborative environment and the file-activity data is stored in one or more file access logs. The access logs may be divided according to periodic time frames. In another embodiment, the processing logic at block 404 computes the file access patters for one of the individual users by determining any one or more of what directories are access by the individual user, what files are accessed by the individual, typical access times of the files by the individual user, frequency of access by the individual user, or a network location (e.g., IP address) of the individual user when accessing the files.

In another embodiment, the processing logic at block 416 reports the anomaly by identifying an incident record corresponding to one of the file accesses of one of the files that contains sensitive information by the individual user and classifying the incident record with a higher priority than other incident records.

Figure 5:
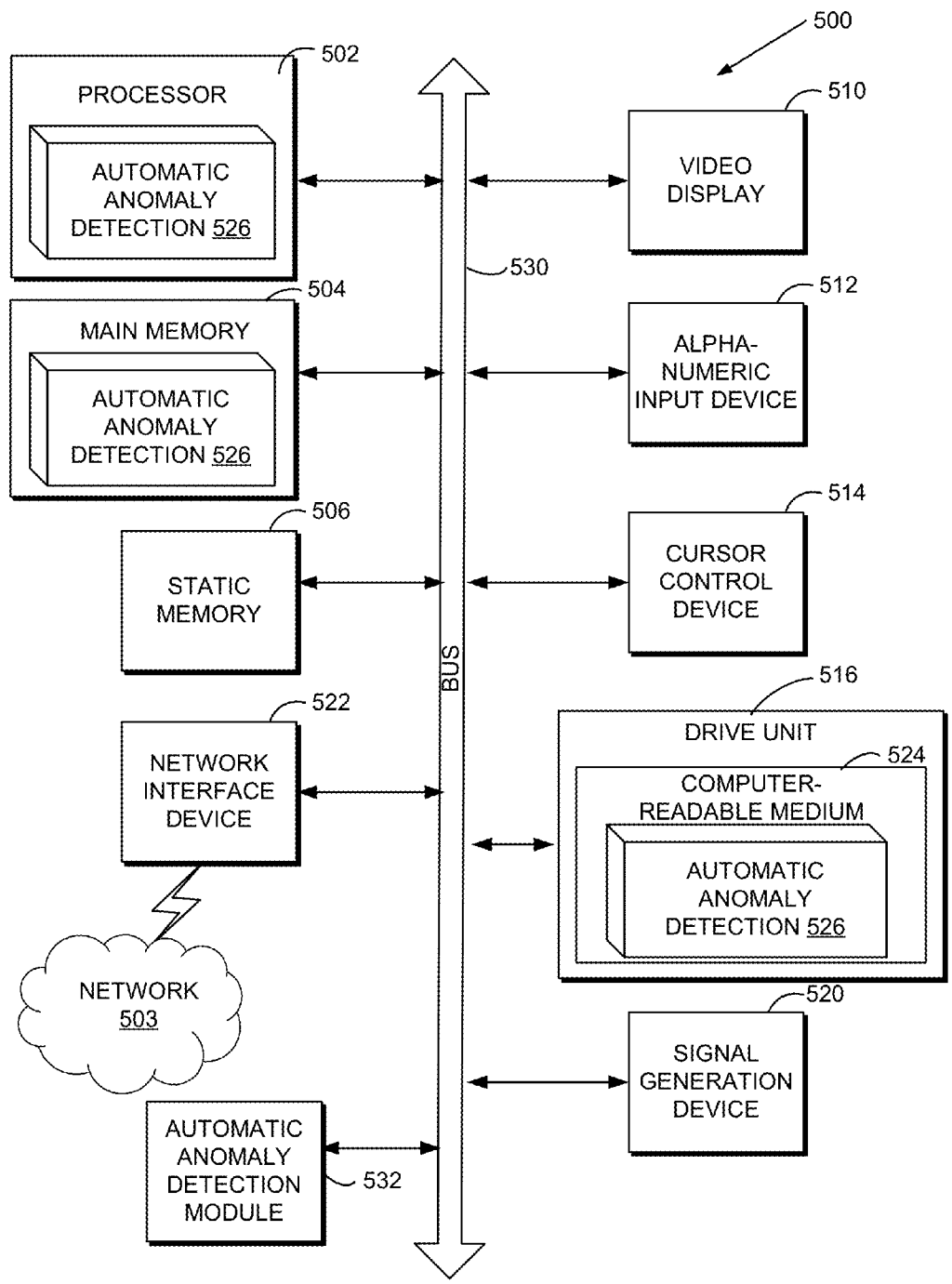
FIG. 5 illustrates a diagrammatic representation of a machine in the exemplary form of a computing system within which a set of instructions, for causing the machine to perform any one or more of the methodologies described herein, may be executed.

FIG. 5 illustrates a diagrammatic representation of a machine in the exemplary form of a computing system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as method 400 of FIG. 4.

The exemplary computing system 500 includes a processor 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 518, which communicate with each other via a bus 506.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic for automatic anomaly detection 526 for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions (e.g., automatic anomaly detection 526) embodying any one or more of the methodologies or functions described herein. The automatic anomaly detection 526 may also reside, completely or at least partially, within the main memory 504 and/or within the processor 502 during execution thereof by the computing system 500, the main memory 504 and the processor 502 also constituting computer-readable media. The automatic anomaly detection 526 may further be transmitted or received over a network 503 via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The automatic anomaly detection module 532, components, and other features described herein (for example in relation to FIGS. 1, 2, 3) can be implemented as discrete hardware components or integrated in the functionality of hardware components such as ASICS, FPGAs, DSPs, or similar devices. The automatic anomaly detection module 532 may implement operations of automatic anomaly detection as described herein with respect to FIGS. 1-4. In addition, the automatic anomaly detection module 532 can be implemented as firmware or functional circuitry within hardware devices. Further, the automatic anomaly detection module 532 can be implemented in any combination hardware devices and software components.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "monitoring," "identifying," "storing," "providing," "selecting," "obtaining," "receiving," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:
1. A method comprising:
    collecting, by an anomaly detection system executing by a processor, file-activity data pertaining to file accesses to files in an identified network share accessed by a group of individual users;

computing, by the anomaly detection system, file access patterns for the individual users in the group from the file-activity data;

for one of the individual users, comparing the individual user's file access pattern against a profile history of the individual user to find a first deviation in the file accesses by the individual user;

identifying, by the anomaly detection system, a cluster of users from the group based on at least one of user collaborations of individual users of the group or a reporting structure of the group of users;

when the first deviation is found, comparing the individual user's file access pattern against a peer history of the other individual users in the cluster to find a second deviation; and reporting, by the anomaly detection system, an anomaly in the file access patterns by the individual user when the first deviation and the second deviation are found.

2. The method of claim 1, wherein the computing the file access patterns comprises computing the file access patterns for the individual users in the group within a certain time frame.

3. The method of claim 1, wherein the identifying the cluster comprises importing an active directory (AD), wherein the AD comprises entries of the group of users and the reporting structure of the group of users.

4. The method of claim 1, wherein the identifying the cluster comprises determining the user collaborations of individual users of the group from the file-activity data.

5. The method of claim 4, wherein the determining the user collaborations comprises inspecting the file-activity data to determine at least one of a set of common files accessed by the cluster of users or a set of files in the identified network share with contributions by the cluster of users.

6. The method of claim 1, wherein the network share is mounted and shared among the group of users in a collaborative environment, and wherein the file-activity data is stored in one or more file access logs.

7. The method of claim 6, wherein the one or more file access logs are divided according to periodic time frames.

8. The method of claim 1, wherein the computing the file access patterns for one of the individual users comprises determining at least one of directories access by the individual user, files accessed by the individual, typical access times of the files by the individual user, frequency of access by the individual user, or a network location of the individual user when accessing the files.

9. The method of claim 1, wherein the reporting the anomaly comprises:

identifying an incident record corresponding to one of the file accesses of one of the files that contains sensitive information by the individual user; and classifying the incident record with a higher priority than other incident records.

10. A computing system comprising:
a memory; and
a processor coupled with the memory to execute an anomaly detection system configured to:
collect file-activity data pertaining to file accesses to files in an identified network share accessed by a group of individual users;
compute file access patterns for the individual users in the group from the file-activity data;
for one of the individual users, compare the individual user's file access pattern against a profile history of the individual user to find a first deviation in the file accesses by the individual user;
identify a cluster of users from the group based on at least one of user collaborations of individual users of the group or a reporting structure of the group of users;
when the first deviation is found, compare the individual user's file access pattern against a peer history of the other individual users in the cluster to find a second deviation; and
report, by the anomaly detection system, an anomaly in the file access patterns by the individual user when the first deviation and the second deviation are found.

11. The computing system of claim 10, wherein the anomaly detection system computes the file access patterns for the individual users in the group within a certain time frame.

12. The computing system of claim 10, wherein the anomaly detection system is further configured to import an active directory (AD), wherein the AD comprises entries of the group of users and the reporting structure of the group of users.

13. The computing system of claim 10, wherein the anomaly detection system is further configured to determine the user collaborations of individual users of the group from the file-activity data by inspecting the file-activity data to determine at least one of a set of common files accessed by the cluster of users or a set of files in the identified network share with contributions by the cluster of users.

14. The computing system of claim 10, wherein the network share is mounted and shared among the group of users in a collaborative environment, wherein the file-activity data is stored in one or more file access logs, and wherein the one or more file access logs are divided according to periodic time frames.

15. The computing system of claim 10, wherein the anomaly detection system is further configured to determine at least one of directories access by the individual user, files accessed by the individual, typical access times of the files by the individual user, frequency of access by the individual user, or a network location of the individual user when accessing the files.

16. The computing system of claim 10, wherein the anomaly detection system is further configured to:
identify an incident record corresponding to one of the file accesses of one of the files that contains sensitive information by the individual user; and
classify the incident record with a higher priority than other incident records.

17. A non-transitory computer readable storage medium including instructions that, when executed by a processor, cause the processor to perform operations comprising:
collecting, by an anomaly detection system executing by a processor, file-activity data pertaining to file accesses to files in an identified network share accessed by a group of individual users;
computing, by the anomaly detection system, file access patterns for the individual users in the group from the file-activity data;
for one of the individual users, comparing the individual user's file access pattern against a profile history of the individual user to find a first deviation in the file accesses by the individual user;
identifying, by the anomaly detection system, a cluster of users from the group based on at least one of user collaborations of individual users of the group or a reporting structure of the group of users;

when the first deviation is found, comparing the individual user's file access pattern against a peer history of the other individual users in the cluster to find a second deviation; and reporting, by the anomaly detection system, an anomaly in the file access patterns by the individual user when the first deviation and the second deviation are found.

18. The non-transitory computer readable storage medium of claim 17, wherein the identifying the cluster comprises importing an active directory (AD), wherein the AD comprises entries of the group of users and the reporting structure of the group of users.

19. The non-transitory computer readable storage medium of claim 17, wherein the identifying the cluster comprises determining the user collaborations of individual users of the group from the file-activity data, and wherein the determining the user collaborations comprises inspecting the file-activity data to determine at least one of a set of common files accessed by the cluster of users or a set of files in the identified network share with contributions by the cluster of users.

20. The non-transitory computer readable storage medium of claim 17, wherein the reporting the anomaly comprises:

identifying an incident record corresponding to one of the file accesses of one of the files that contains sensitive information by the individual user; and classifying the incident record with a higher priority than other incident records.

\* \* \* \* \*